US011932224B2

(12) United States Patent
Itakura et al.

(10) Patent No.: US 11,932,224 B2
(45) Date of Patent: Mar. 19, 2024

(54) BRAKE CONTROL DEVICE AND BRAKE SYSTEM

(71) Applicant: HITACHI AUTOMOTIVE SYSTEMS, LTD., Hitachinaka (JP)

(72) Inventors: Kyoshiro Itakura, Tokyo (JP); Toshiyuki Ajima, Tokyo (JP); Takahiro Ito, Tokyo (JP); Kenichiro Matsubara, Hitachinaka (JP); Daisuke Goto, Hitachinaka (JP); Makoto Matsuura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 451 days.

(21) Appl. No.: 17/283,914

(22) PCT Filed: Aug. 15, 2019

(86) PCT No.: PCT/JP2019/032015
§ 371 (c)(1),
(2) Date: Apr. 8, 2021

(87) PCT Pub. No.: WO2020/075386
PCT Pub. Date: Apr. 16, 2020

(65) Prior Publication Data
US 2022/0001845 A1 Jan. 6, 2022

(30) Foreign Application Priority Data
Oct. 11, 2018 (JP) .................. 2018-192392

(51) Int. Cl.
*B60T 8/00* (2006.01)
*B60T 1/00* (2006.01)
(Continued)

(52) U.S. Cl.
CPC ............ *B60T 8/172* (2013.01); *B60T 13/746* (2013.01); *B60T 17/221* (2013.01);
(Continued)

(58) Field of Classification Search
CPC ...... B60T 8/172; B60T 13/746; B60T 17/221; B60T 1/065; B60T 2201/03; B60T 17/22;
(Continued)

(56) References Cited

U.S. PATENT DOCUMENTS 6,481,805 B1    11/2002  Ichinose
8,235,474 B2 *   8/2012  Yamaguchi ........... B60T 13/741
                                               303/191
(Continued)

FOREIGN PATENT DOCUMENTS

JP    H11-101283 A    4/1999
JP    2001-239929 A   9/2001
(Continued)

OTHER PUBLICATIONS

Office Action issued in corresponding Chinese Patent Application No. 201980064351.X dated Dec. 23, 2022 (8 pages).
(Continued)

*Primary Examiner* — Yonel Beaulieu
(74) *Attorney, Agent, or Firm* — Foley & Lardner LLP

(57) ABSTRACT

An object of the present invention is to provide a brake control device and a brake system capable of braking with a shortened braking response when shifting from non-braking to braking. A brake control device 10 includes a command value calculation unit 4 that calculates an operation command value required to make a pressing force by which a brake pad 11*a* is pressed against a brake disc 11*b* reach a target thrust value. The command value calculation unit 4 includes: a clearance command calculation unit 43 that calculates a command value required for contact between the brake pad 11*a* and the brake disc 11*b*; and a thrust command calculation unit 40 that calculates a command value required for reaching the target thrust from a state where the brake pad 11*a* and the brake disc 11*b* are in
(Continued)

contact with each other. When calculating the operation command value from a state where the brake pad 11*a* and the brake disc 11*b* are separated, the command value calculation unit 4 calculates the operation command value by integrating the command value calculated from the clearance command calculation unit 43 and the command value calculated from the thrust command calculation unit 40.

7 Claims, 8 Drawing Sheets

(51) Int. Cl.
| | | |
|---|---|---|
| *B60T 8/172* | (2006.01) | |
| *B60T 13/74* | (2006.01) | |
| *B60T 17/22* | (2006.01) | |
| *F16D 65/14* | (2006.01) | |
| *F16D 65/18* | (2006.01) | |
| *B60T 1/06* | (2006.01) | |
| *F16D 66/00* | (2006.01) | |
| *F16D 121/24* | (2012.01) | |

(52) U.S. Cl.
CPC ............ *F16D 65/183* (2013.01); *B60T 1/065* (2013.01); *B60T 2201/03* (2013.01); *F16D 2066/005* (2013.01); *F16D 2121/24* (2013.01)

(58) Field of Classification Search
CPC .......... B60T 13/741; B60T 13/74; B60T 8/17; B60T 8/00; B60T 17/00; F16D 65/183; F16D 2066/005; F16D 2121/24; F16D 2127/02; F16D 65/64; F16D 66/00; F16D 65/18; B60Y 2400/301; B60Y 2400/81
See application file for complete search history.

(56) References Cited

U.S. PATENT DOCUMENTS

| | | | |
|---|---|---|---|
| 2002/0026272 A1 | 2/2002 | Yamamoto | |
| 2002/0027387 A1 | 3/2002 | Kubota | |
| 2008/0059023 A1 | 3/2008 | Ueno et al. | |
| 2009/0032342 A1* | 2/2009 | Yamaguchi | ........... B60T 13/741 |
| | | | 188/72.3 |
| 2016/0200308 A1 | 7/2016 | Masuda | |
| 2018/0056951 A1 | 3/2018 | Baehrle-Miller | |
| 2018/0072285 A1* | 3/2018 | Tanaka | .................. F16D 55/226 |

FOREIGN PATENT DOCUMENTS

| | | |
|---|---|---|
| JP | 2002-067906 A | 3/2002 |
| JP | 2002-081475 A | 3/2002 |
| JP | 2003-202042 A | 7/2003 |
| JP | 2010-203562 A | 9/2010 |
| JP | 2015-048036 A | 3/2015 |
| JP | 2018-514449 A | 6/2018 |

OTHER PUBLICATIONS

International Search Report with English translation and Written Opinion issued in corresponding application No. PCT/JP2019/032015 dated Oct. 8, 2019.

* cited by examiner

FIG. 5
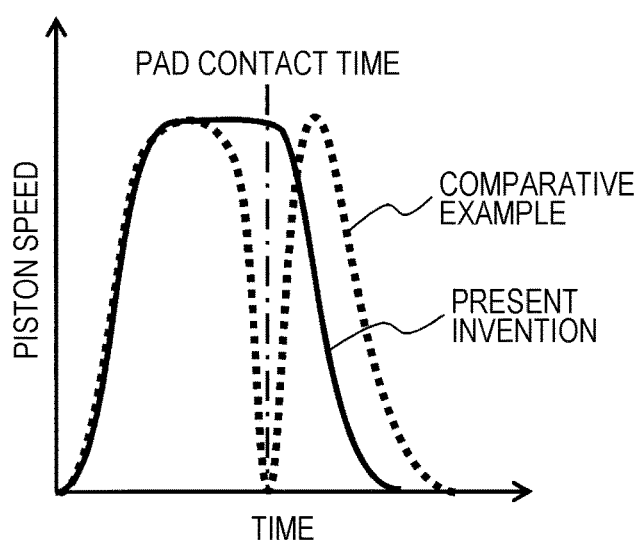
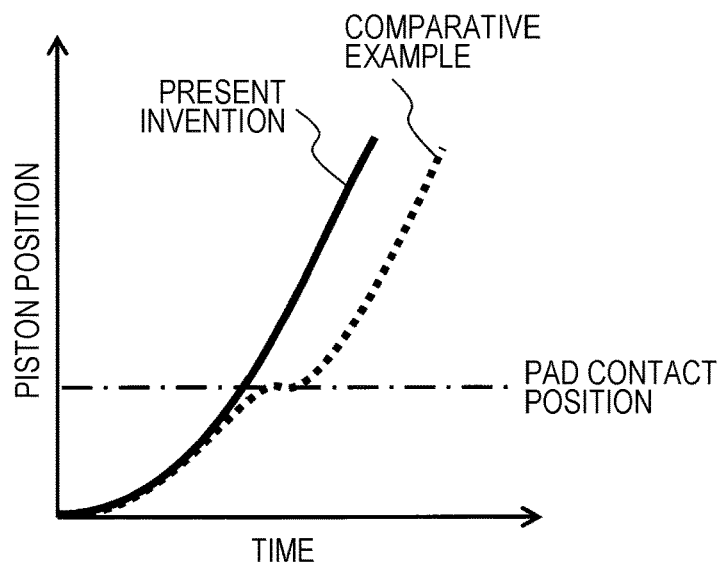
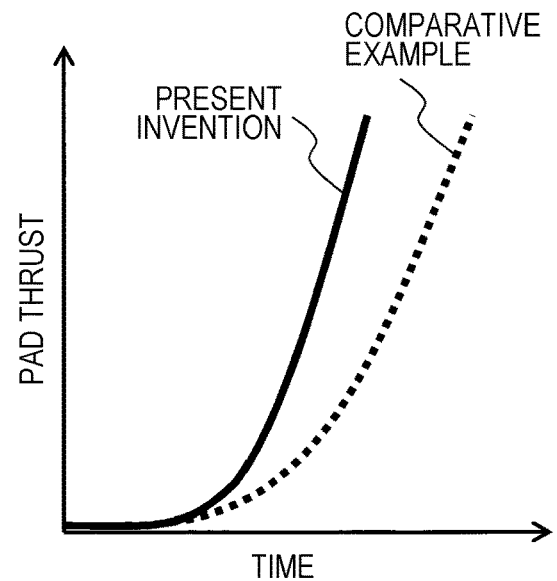

FIG. 6
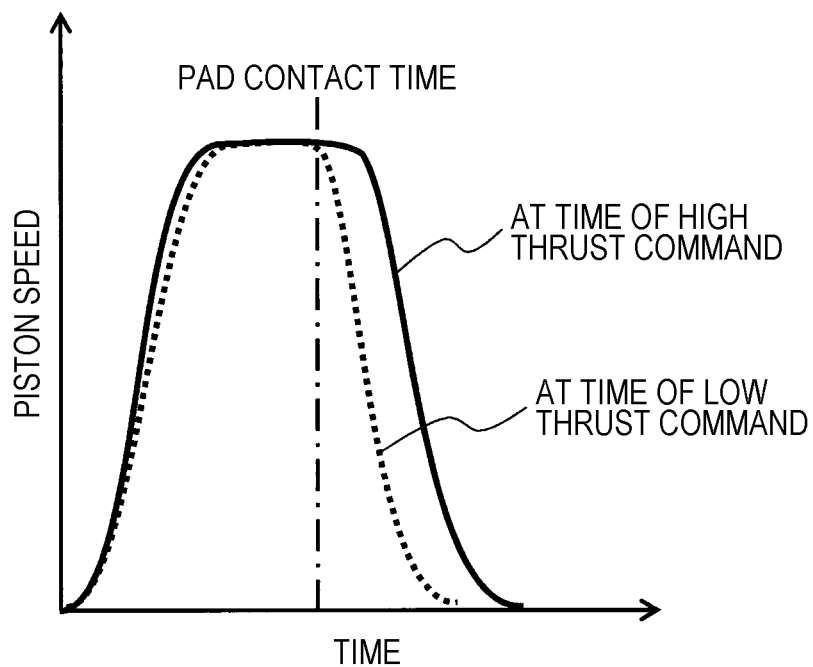
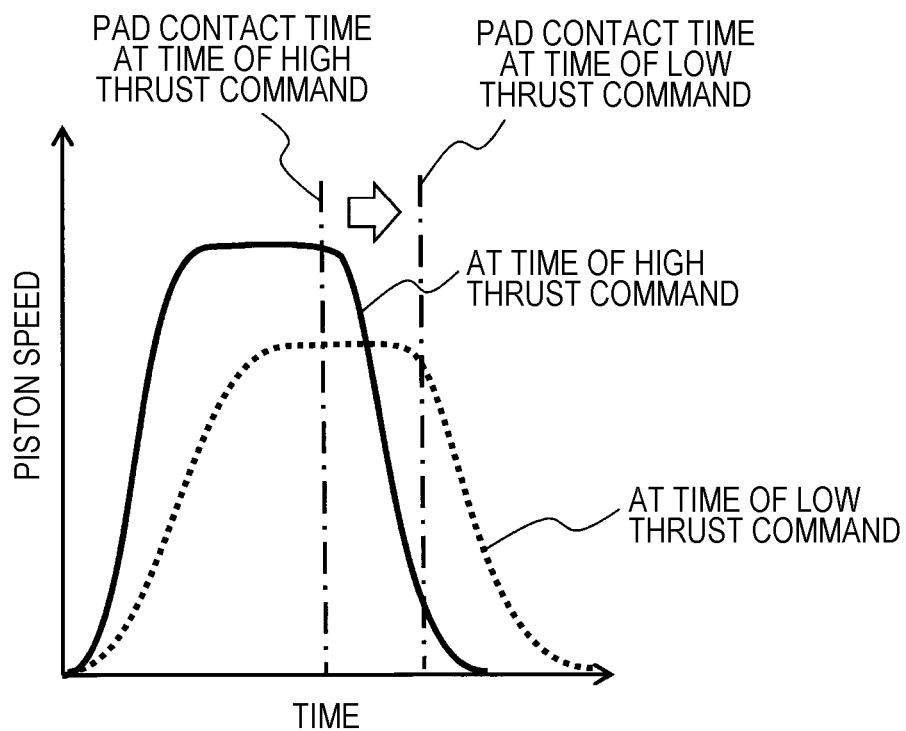

BRAKE CONTROL DEVICE AND BRAKE SYSTEM

TECHNICAL FIELD

The present invention relates to a brake control device and a brake system which are mounted on a vehicle, such as an automobile, and brake the rotation of wheels.

BACKGROUND ART

Vehicles such as automobiles are equipped with a brake system that applies a braking force to wheels according to the amount of depression of a brake pedal by a driver. Conventionally, many of these brake systems are hydraulic systems, but electric systems have been increasing recently.

A brake system using the electric system can pull back a brake piston, which is difficult with the hydraulic system, and thus, clearance control that provides a desired gap between a brake pad and a brake disc is possible, so that it is possible to expect improvement in fuel efficiency by reducing dragging of the brake pad. In addition, when the pedal is depressed, the braking force is controlled using a distortion sensor or the like after contact with the brake pad by the clearance control. For these series of brake control, in order to improve safety and/or brake feel, a technique for enhancing braking response and accuracy is important. In this background, for example, those described in PTLs 1 to 3 as techniques related to clearance control and subsequent braking force control.

PTL 1 describes an electric brake device including: a brake rotor; a brake pad; an electric motor; a linear motion mechanism that converts the rotary motion of the electric motor into a linear motion and transmits the linear motion to the brake pad; and a controller that controls the electric motor. In the described configuration, the controller includes: a motor angular velocity control section that controls an angular velocity of the electric motor; and a motor angular velocity limiting section that limits an angular velocity of the electric motor through the motor angular velocity control section such that an angular velocity $\omega b$ of the electric motor in a no-load state, controlled by the motor angular velocity control section when a state shifts from a non-braking state where a clearance is formed between the brake pad and the brake rotor to a braking state where the clearance is zero, and an angular velocity $\omega r$ of the electric motor in a no-load state, controlled by the motor angular velocity control section when the state shifts from the braking state to the non-braking state, satisfy $|\omega b|>|\omega r|$, so that it is possible to suppress the generation of operating noise and prevent a response delay of the brake.

In addition, PTL 2 discloses a configuration in which a control means for controlling an electric motor to cause a piston to generate target thrust by thrust control based on the piston thrust detected by a thrust detection means and position control based on a motor rotation position detected by a position detection means changes a distribution of control amounts of the thrust control and position control according to the piston thrust detected by the thrust detection means.

In addition, PTL 3 discloses a configuration in which a pad position control unit that moves a position of a brake pad to a position in contact with a brake rotor and a braking force control unit that controls a force of pressing the brake pad are provided, and the brake pad is first brought into contact with the brake rotor by a pad clearance in response to a command of the pad position control unit, and then, a pressing force of the brake pad is controlled according to a braking force request command value by switching to a command of the braking force control unit, during a braking operation.

CITATION LIST

Patent Literature

PTL 1: JP 2015-48036 A
PTL 2: JP 2003-202042 A
PTL 3: JP 2001-239929 A

SUMMARY OF INVENTION

Technical Problem

In PTL 1, when shifting from braking to non-braking, a speed limit of the motor is set to be smaller than that at the time of shifting from non-braking to braking, thereby reducing the operating noise to reduce the driver's discomfort. In addition, the movement time to a clearance position increases when setting the speed limit of the motor to be small, so that it is possible to perform braking with a high response at the next sudden pedal depression. However, there is no contribution to the improvement of control accuracy and response when shifting from a state where the piston is held at the clearance position to the time of braking.

In addition, in PTL 2, the distribution of the thrust control and position control is changed according to a value of a thrust sensor and a magnitude of a thrust command value, so that insufficient resolution of the thrust sensor can be compensated by position control and can be controlled with high accuracy particularly in a low thrust region. Therefore, the control accuracy during braking, which is a concern in PTL 1, is improved. However, there is no expectation regarding improvement of the response until the brake pad and the disc come into contact with each other from the clearance position and a desired thrust is generated.

On the other hand, in PTL 3, the position control is performed from the clearance position to the contact position between the pad and the disc, and then, switching to the thrust control is performed, so that it is possible to improve the response to the contact position between the pad and the disc, which avoids the problem of PTL 2. However, in PTL 3, the position control is completed immediately before the contact position between the pad and the disc at the time of switching between the position control and the thrust control, and thus, the response is likely to deteriorate due to converging movement of the piston position.

Therefore, the present invention provides a brake control device and a brake system capable of braking with a shortened braking response when shifting from non-braking to braking.

Solution to Problem

In order to solve the above problems, a brake control device according to the present invention is a brake control device which is mounted on a brake system at least including a piston that moves in a linear motion direction by rotation of an electric motor, a brake pad that is pressed against a brake disc by the movement of the piston, and a position detection unit that detects a position of the piston, and controls a motion of the piston, and includes a command calculation unit that calculates an operation command value for making a pressing force by which the brake pad is pressed against the brake disc reach a target thrust value. The command calculation unit includes: a clearance command calculation unit that calculates a command value required for contact between the brake pad and the brake disc; and a thrust command calculation unit that calculates a command value required for reaching a target thrust from a state where the brake pad and the brake disc are in contact with each other. The command calculation unit calculates the operation command value by integrating the command value calculated from the clearance command calculation unit and the command value calculated from the thrust command calculation unit when calculating the operation command value from a state where the brake pad and the brake disc are separated from each other.

In addition, a brake system according to the present invention is a brake system including: a piston that moves in a linear motion direction by rotation of an electric motor; a brake pad that is pressed against a brake disc by the movement of the piston; a position detection unit that detects a position of the piston; and a brake control device that controls a motion of the piston. The brake control device includes a command calculation unit that calculates an operation command value for making a pressing force by which the brake pad is pressed against the brake disc reach a target thrust value. The command calculation unit includes: a clearance command calculation unit that calculates a command value required for contact between the brake pad and the brake disc; and a thrust command calculation unit that calculates a command value required for reaching a target thrust from a state where the brake pad and the brake disc are in contact with each other. The command calculation unit calculates the operation command value by integrating the command value calculated from the clearance command calculation unit and the command value calculated from the thrust command calculation unit when calculating the operation command value from a state where the brake pad and the brake disc are separated from each other.

Advantageous Effects of Invention

According to the present invention, it is possible to provide the brake control device and the brake system capable of braking with the shortened braking response when shifting from non-braking to braking.

Other objects, configurations, and effects which have not been described above become apparent from embodiments to be described hereinafter.

BRIEF DESCRIPTION OF DRAWINGS

FIG. 5 is a graph illustrating a temporal change of a piston speed, a temporal change of a piston position, and a temporal change of a pad thrust in the brake system according to the first embodiment and a comparative example.

FIG. 6 is a graph illustrating a temporal change of a piston speed in the brake system and a thrust feedback control method according to the first embodiment.

DESCRIPTION OF EMBODIMENTS

Hereinafter, embodiments of the present invention will be described in detail with reference to the accompanying drawings, but the present invention is not limited to the following embodiments, and various modifications and applications that fall within the technological concept of the present invention will be also included in the scope of the present invention.

First Embodiment

Figure 1:
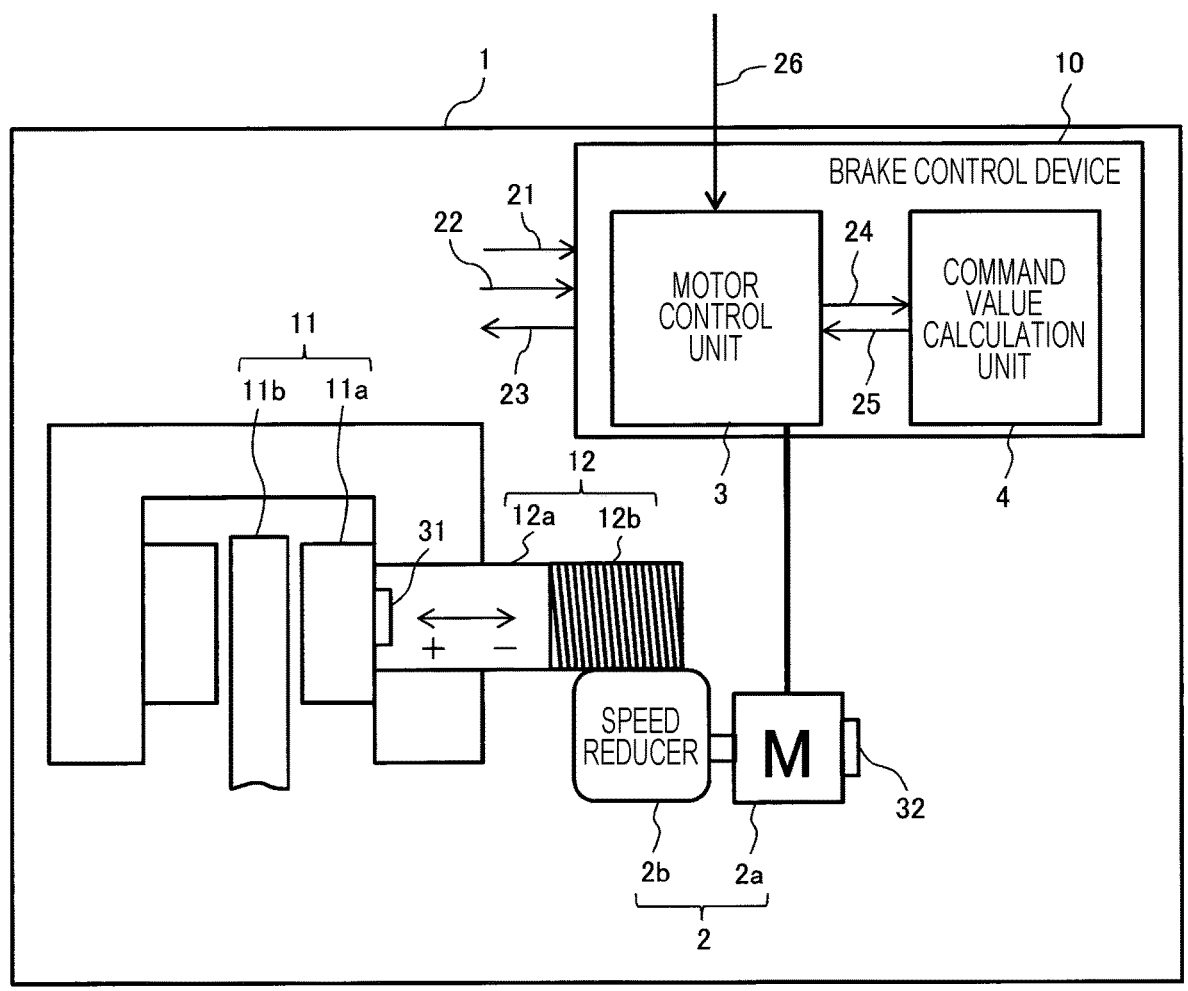
FIG. 1 is a schematic composition of a brake system according to a first embodiment of the present invention.

FIG. 1 is a schematic composition of a brake system of a first embodiment according to one embodiment of the present invention, and illustrates a configuration corresponding to an electric brake for one wheel of a plurality of wheels provided in a vehicle.

As illustrated in FIG. 1, a brake system 1 mainly includes a drive mechanism 2, a brake control device 10, a braking mechanism 11, and a rotation/linear motion conversion mechanism 12. Among these, the drive mechanism 2 includes an electric motor 2a and a speed reducer 2b, and the brake control device 10 includes a motor control unit 3 and a command value calculation unit 4. The braking mechanism 11 has a brake pad 11a and a brake disc 11b arranged to come into contact with and separate from each other, and the rotation/linear motion conversion mechanism 12 is a rod-shaped member including a piston 12a and a feed screw 12b. Note that the motor control unit 3 and the command value calculation unit 4 are realized by, for example, a processor such as a central processing unit (CPU) (not illustrated), a ROM that stores various programs, a RAM that temporarily stores data in a calculation process, and a storage device such as an external storage device. The processor such as the CPU reads and executes the various programs stored in the ROM, and stores a calculation result, which is an execution result, in the RAM or the external storage device.

In the brake system 1 illustrated in FIG. 1, a rotational driving force generated by the electric motor 2a is decelerated by the speed reducer 2b, the decelerated rotational driving force is converted into a linear driving force via the feed screw 12b, and the brake pad 11a is pressed against the brake disc 11b by linear driving of the piston 12a, thereby applying a braking force to the rotating brake disc 11b. Hereinafter, a direction in which the piston 12a approaches the brake disc 11b and an opposite direction thereof are defined as a positive direction and a negative direction, respectively.

When performing the above braking operation, the motor control unit 3 constituting the brake control device 10 controls a rotation speed and a position of the electric motor 2a and adjusts a pressing force of the brake pad 11a. In addition, the brake control device 10 estimates a braking force of the brake pad 11a based on a thrust detected by a thrust sensor 31 installed in the rotation/linear motion conversion mechanism 12. Further, the brake control device 10 estimates a position of the brake pad 11a based on a rotation position detected by a position sensor 32 installed in the electric motor 2a. Note that the position sensor 32 may be attached to the piston 12a to directly detect a position of the piston 12a.

Here, a control signal line 21, a communication line 22, a communication line 23, and a main power line 26 are connected to the brake control device 10. In addition, the internal motor control unit 3 and the command value calculation unit 4 are connected to each other so as to be capable of communicating with each other by a communication line 24 and a communication line 25. Among these, the control signal line 21 inputs a control command from a host control device such as a vehicle control ECU (not illustrated) to the brake control device 10. The communication line 22 and the communication line 23 communicate information other than the control command with the host control device. Note that the host control device and the brake control device 10 are separate devices here, but the both may be configured as an integrated control device.

Figure 2:
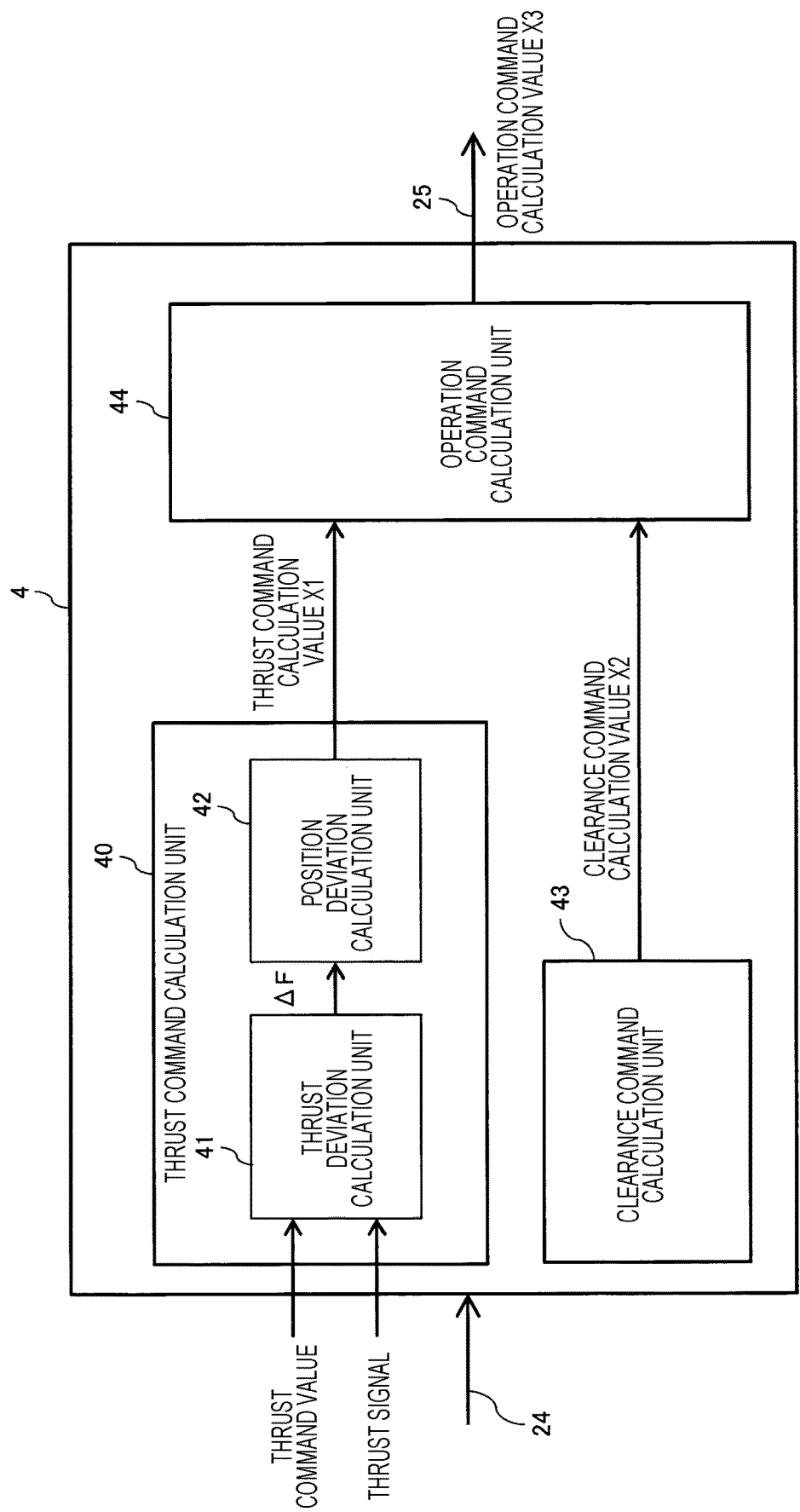
FIG. 2 is a functional block diagram of a command value calculation unit constituting a brake control device illustrated in FIG. 1.

Next, details of the command value calculation unit 4 will be described with reference to FIG. 2. FIG. 2 is a functional block diagram of the command value calculation unit 4 constituting the brake control device 10 illustrated in FIG. 1. As illustrated in FIG. 2, the command value calculation unit 4 includes a thrust command calculation unit 40, a clearance command calculation unit 43, and an operation command calculation unit 44. Further, the thrust command calculation unit 40 includes a thrust deviation calculation unit 41 and a position deviation calculation unit 42.

The command value calculation unit 4 inputs a signal from the motor control unit 3 via the communication line 24, and outputs a signal to the motor control unit 3 via the communication line 25. Note that the actual command value calculation unit 4 includes a CPU, a calculation device such as a microcomputer, and a main storage device such as a semiconductor memory, an auxiliary storage device such as a hard disk. and hardware such as a communication device, and realizes each function illustrated in FIG. 2 as the calculation device executes a program stored in the storage device while referring to a database or the like recorded in the auxiliary storage device. Hereinafter, a description will be given while appropriately omitting such a well-known operation.

<Thrust Command Calculation Unit 40>

The thrust command calculation unit 40 calculates a piston position advance amount required to generate a thrust command value based on a difference between a thrust command value transmitted from the host vehicle control ECU (not illustrated) and a thrust signal from the thrust sensor 31, and outputs a thrust command calculation value X1 to the operation command calculation unit 44.

[Thrust Deviation Calculation Unit 41]

The thrust deviation calculation unit 41 calculates a difference between a thrust signal from the thrust sensor 31, generated after the piston 12a is moved toward the brake disc 11b and the brake pads 11a and the brake disc 11b come into contact with each other, and the thrust command value transmitted from the host vehicle control ECU (not illustrated), and outputs a thrust deviation ΔF, which is the calculation result, to the position deviation calculation unit 42.

[Position Deviation Calculation Unit 42]

Figure 4:
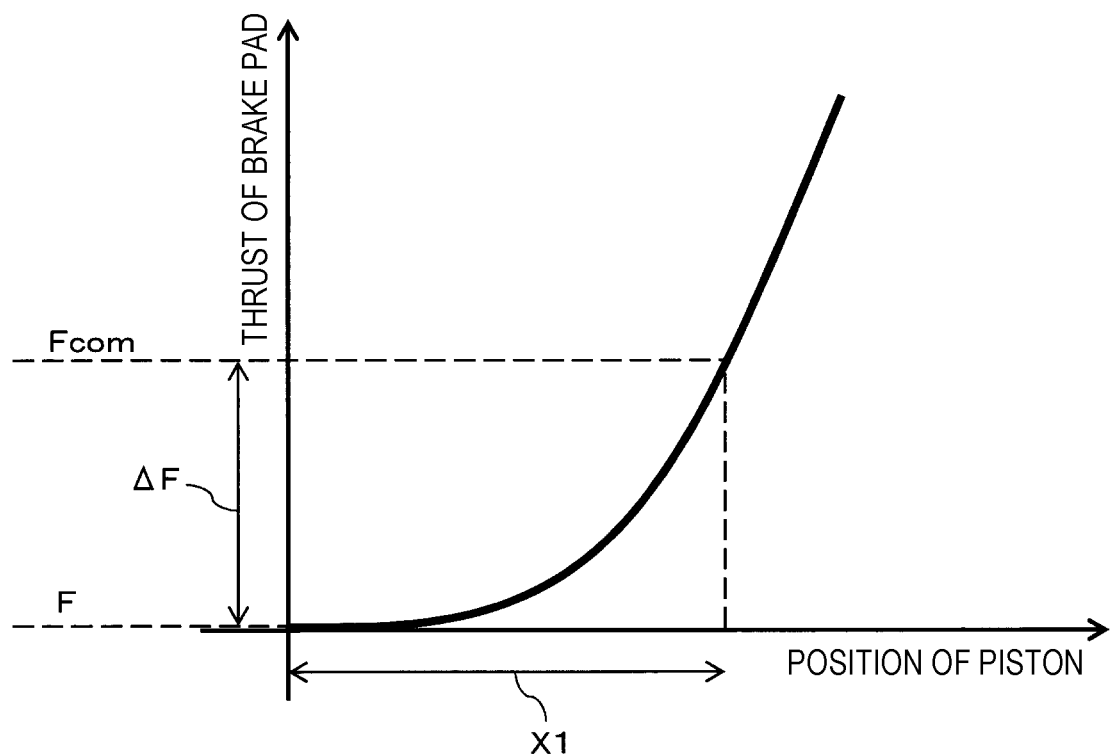
FIG. 4 is a conceptual diagram illustrating a calculation method of a thrust command calculation unit illustrated in FIG. 2.

The position deviation calculation unit 42 converts the thrust deviation ΔF input from the thrust deviation calculation unit 41 into a piston position deviation. Here, an example of a method for converting the thrust deviation ΔF into the piston position deviation will be described. FIG. 4 is a conceptual diagram illustrating a calculation method of the thrust command calculation unit 40 illustrated in FIG. 2. FIG. 4 illustrates a rigidity characteristic of a brake caliper. The position deviation calculation unit 42 uses this rigidity characteristic of the brake caliper to perform conversion into a piston position deviation X1 corresponding to the thrust deviation ΔF (difference between a thrust command value Fcom and a thrust signal F from the thrust sensor 31) input from the thrust deviation calculation unit 41. Instead, for example, the thrust deviation ΔF may be multiplied by a constant value as a fixed gain for conversion, or conversion into a rotation position of the electric motor 2a, instead of the piston position, may be performed. The point is that the piston 12a needs to be moved to a position where a desired thrust is generated, which makes it possible to adjust the piston position until the thrust converges to a desired value.

<Clearance Command Calculation Unit 43>

The clearance command calculation unit 43 calculates clearance information between the brake pad 11a and the brake disc 11b. Here, for example, a position where the brake pad 11a and the brake disc 11b come into contact with each other and the thrust starts to increase when the piston 12a is advanced in the positive direction is stored as a pad contact position, and a clearance position is defined as a position where the brake pad 11a is moved in the negative direction by a predetermined amount required to prevent dragging from the pad contact position. A difference between the pad contact position and the clearance position at this time is output to the operation command calculation unit 44 as a clearance command calculation value X2. Meanwhile, the pad contact position may be one learned as described above or may be a predetermined contact position. The point is that the distance needs to be appropriately provided between the clearance position and the pad contact position.

<Operation Command Calculation Unit 44>

The operation command calculation unit 44 adds the thrust command calculation value X1 output from the thrust command calculation unit 40 and the clearance command calculation value X2 output from the clearance command calculation unit 43 to calculate an operation command calculation value X3. In other words, the operation command calculation unit 44 calculates the operation command value by integrating the command value calculated by the thrust command calculation unit 40 and the command value calculated by the clearance command calculation unit 43. As a result, when the braking operation is performed from a non-braking state, the command value X3 is created in consideration of the position information X2 (clearance command calculated value) until the brake pad 11a comes into contact with the brake disc 11b and the piston advance amount X1 (thrust command calculation value) required for energizing from the pad contact position. When operating with the command value X3 created here, a desired thrust can be generated with a high response without causing deceleration of the piston near the pad contact position, which is a problem in PTL 3. In general, a piston speed decreases when a thrust command is small so that a response to a pad contact position becomes poor in brake control including only thrust feedback. However, according to the present embodiment, the clearance command calculation value X2 and the thrust command calculation value X1 are separately calculated, and thus, a piston speed to the pad contact position or a response time is determined regardless of the magnitude of the thrust command.

Figure 3:
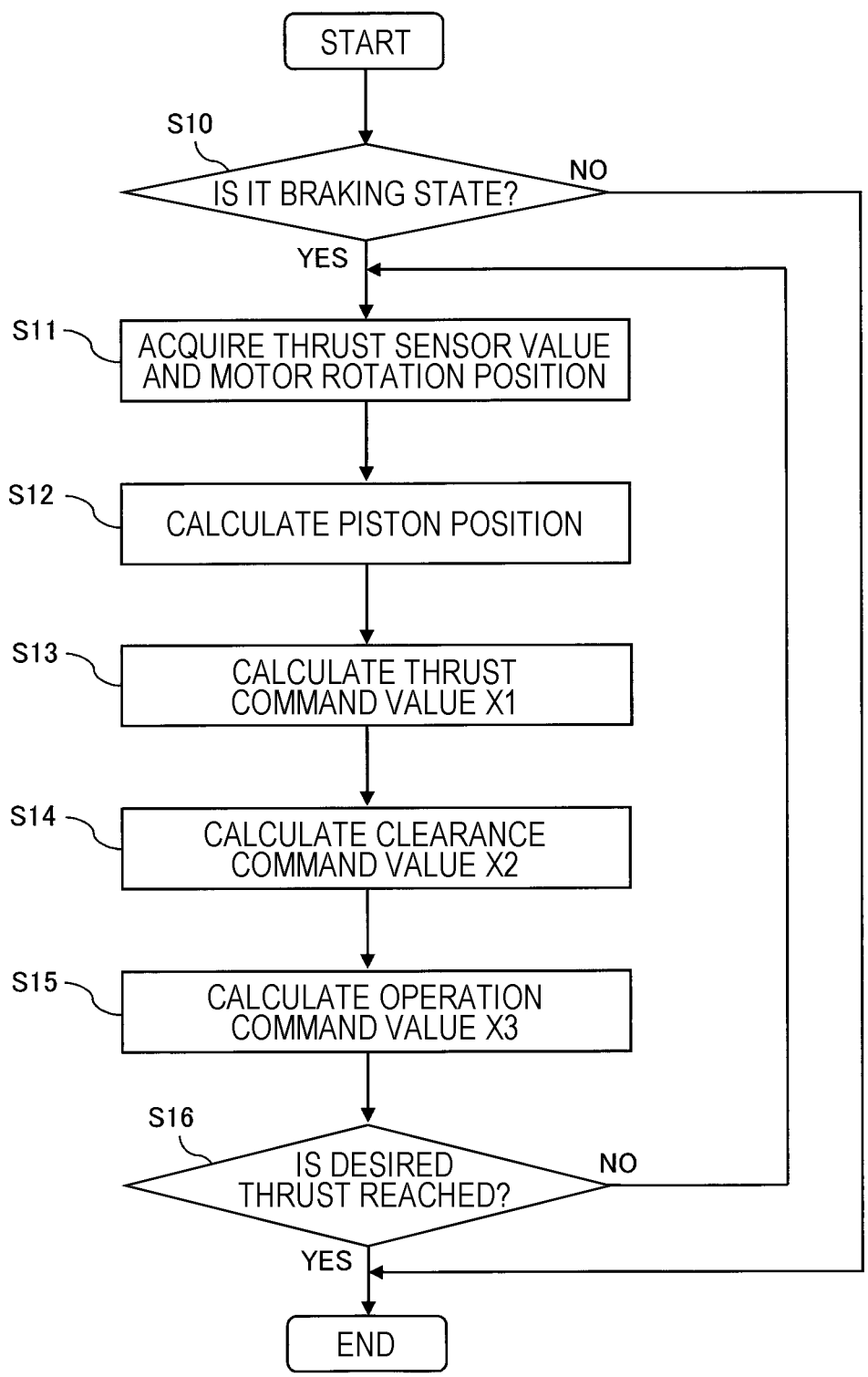
FIG. 3 is a flowchart illustrating a command value calculation method.

The functional block of the command value calculation unit 4 illustrated in FIG. 2 is actually executed by software stored in a memory of a microcomputer. Next, this calculation flow will be described with reference to FIG. 3. FIG. 3 is a flowchart illustrating a command value calculation method.

<<Step S10>>

In Step S10, a host control device such as an ECU (not illustrated) determines whether or not a vehicle is currently in a braking state. This determination can be made based on whether a driver depresses a brake pedal by a predetermined amount or more and a thrust command value is zero or more. In the case of a non-braking state, the processing exits to the end and waits for the next start timing. On the other hand, the processing proceeds to the next Step S11 in the case of a braking state.

<<Step S11>>

In Step S11, a thrust of the brake pad 11a is detected from an output of the thrust sensor 31 installed in the rotation/linear motion conversion mechanism 12 via the communication line 24, and a rotation position of the electric motor 2a is detected from an output of the position sensor 32 installed in the electric motor 2a.

<<Step S12>>

In Step S12, a piston position calculation unit (not illustrated) converts the rotation position of the electric motor 2a obtained in Step S11 into a linear motion direction according to a ratio between rotation and a linear motion as in the following Formula (1).

$$Xp=\theta \times (L/\varepsilon)[\text{mm}] \quad (1)$$

Note that Xp is a piston position [mm], θ is a motor rotation position [rev], L is a lead [mm/rev] of the feed screw 12b, and ε is a speed reduction ratio of the speed reducer 2b.

Here, these pieces of information are stored in a temporary storage area of a RAM provided in a microcomputer, and used for calculations to be executed in the following control steps. Note that it is also possible to detect information other than these in accordance with the brake system 1.

<<Step S13>>

In Step S13, the thrust command calculation unit 40 calculates the thrust deviation ΔF between the thrust command value Fcom obtained from the control signal line 21 via the communication line 24 and the thrust signal F detected by the thrust sensor 31 obtained in Step S11 using the following Formula (2).

$$\Delta F = F\text{com} - F[N] \quad (2)$$

In addition, the rigidity characteristic of the brake caliper illustrated in FIG. 4 is used here as described above in order to convert ΔF obtained by Formula (2) into a position deviation. Now, ΔF in FIG. 4 is calculated by Formula (2), and the piston advance amount required to generate the desired thrust Fcom at this time is X1 (thrust command calculation value) illustrated on the horizontal axis.

<<Step S14>>

In Step S14, the clearance command calculation unit 43 calculates the difference X2 (clearance command calculation value) between the detected or estimated pad contact position Xp and a piston position Xc that holds a clearance in the non-braking state using the following Formula (3).

$$X2 = Xp - Xc[m] \quad (3)$$

<<Step S15>>

In Step S15, the operation command calculation unit 44 adds X1 (thrust command calculation value) and X2 (clearance command calculation value) calculated in Steps S13 and S14 to calculate the operation command value of the piston position using the following Formula (4).

$$X3 = X1 + X2[m] \quad (4)$$

<<Step S16>>

In Step S16, after the piston 12a operates for one control cycle by the operation command value X3 calculated in Step S15, the thrust command calculation unit 40 determines whether or not the braking force has reached the thrust command value Fcom. When the arrival and convergence are determined, the piston 12a stops operating and shifts to the end. However, if the driver changes an operating amount of the brake pedal during braking, the loop from Step S11 to Step S16 is executed at any time accordingly, and a piston position operates so as to satisfy a desired thrust.

The effect of the present invention is illustrated in FIG. 5. FIG. 5 is a graph illustrating a temporal change of a piston speed, a temporal change of a piston position, and a temporal change of a pad thrust in the brake system 1 according to the present embodiment and a comparative example. Here, a case where the technique described in PTL 3 is used is illustrated as the comparative example. In the present embodiment, the position command X2 (clearance command calculated value) from the clearance position to the pad contact position and the piston position advance amount X1 (thrust command calculation value) that satisfies the thrust command value are added to obtain the control command X3 (operation command calculation value) through the above calculation. Therefore, it is unnecessary to switch the control, and the piston speed does not decrease near the pad contact position as is clear from the temporal change of the piston speed illustrated in the upper part of FIG. 5. In addition, the electric motor 2a is smoothly driven to a position where a desired thrust is generated as indicated by the temporal change of the piston position illustrated in the middle part of FIG. 5. Moreover, the responsiveness can be enhanced as indicated by the temporal change of the pad thrust illustrated in the lower part of FIG. 5.

Here, proportional integral control (PI control) by feedback of a thrust sensor value or the like is conceivable as a method for smooth driving without switching of the control as in the present invention. FIG. 6 illustrates a temporal change of a piston speed in the brake system and a thrust feedback control method according to the present embodiment. The upper graph of FIG. 6 illustrates the temporal change of the piston speed in the brake system 1 of the present embodiment, and the lower graph of FIG. 6 illustrates the temporal change of the piston speed in the thrust feedback control method. As illustrated in the upper graph of FIG. 6, the piston speed to the pad contact position or response time is determined regardless of the magnitude of the thrust command (at the time of a high thrust command and at the time of a low thrust command) according to the brake system 1 of the present embodiment. On the other hand, as illustrated in the lower graph of FIG. 6, a piston movement speed varies depending on the magnitude of the command in the PI control of the thrust feedback control method, and thus, the piston speed decreases and the response becomes poor at the time of a low thrust command. In addition, if a gain in the PI control of the thrust feedback control method is increased, the speed decrease can be prevented, but overshooting occurs.

As described above, it is possible to provide the brake control device and the brake system capable of braking with the shortened braking response when shifting from non-braking to braking according to the present embodiment.

Second Embodiment

Figure 7:
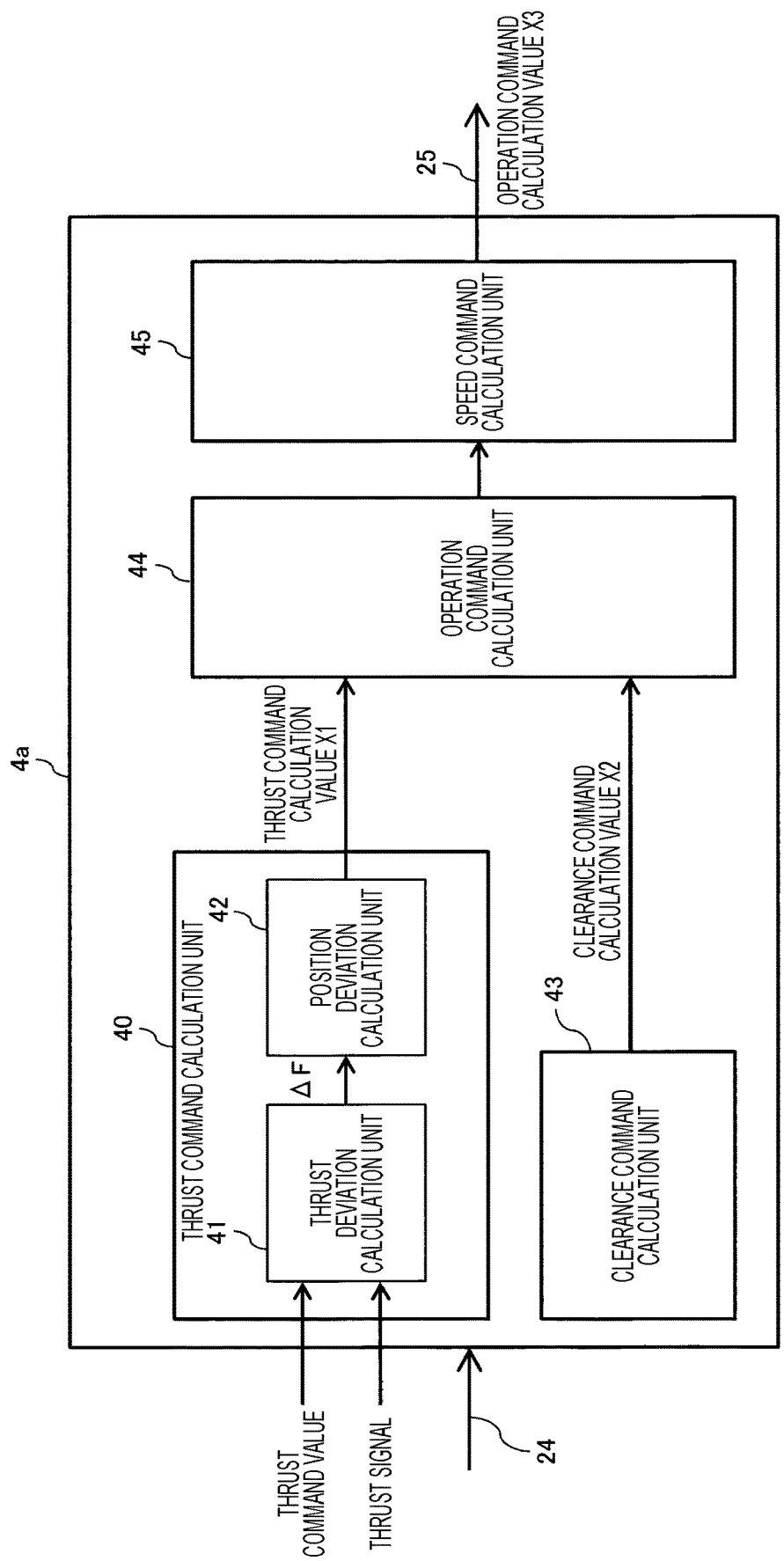
FIG. 7 is a functional block diagram of a command value calculation unit of a second embodiment according to another embodiment of the present invention.

FIG. 7 is a functional block diagram of a command value calculation unit of a second embodiment according to another embodiment of the present invention. The present embodiment is different from the first embodiment in that a command value calculation unit 4a further includes a speed command calculation unit 45. Other configurations are the same as those in the first embodiment, the same components as those in the first embodiment are denoted by the same reference signs, and the description overlapping with the first embodiment will be omitted hereinafter.

As illustrated in FIG. 7, the command value calculation unit 4a according to the present embodiment includes the speed command calculation unit 45 in addition to the thrust command calculation unit 40 having the thrust deviation calculation unit 41 and the position deviation calculation unit 42, the clearance command calculation unit 43, and the operation command calculation unit 44.

The speed command calculation unit 45 creates a speed command so as to follow a position command value obtained by the operation command calculation unit 44. In practice, it is conceivable to take a difference between the position command value and a current piston position and multiply the difference by a gain to obtain the speed command. Alternatively, the speed command may be calculated from an equation of motion in consideration of the inertia of a caliper. Through the above calculation, the operation command calculation value X3 as the speed command is output to the motor control unit 3 in the present embodiment.

The same effect as that in the first embodiment described above can be also obtained in the present embodiment.

Third Embodiment

Figure 8:
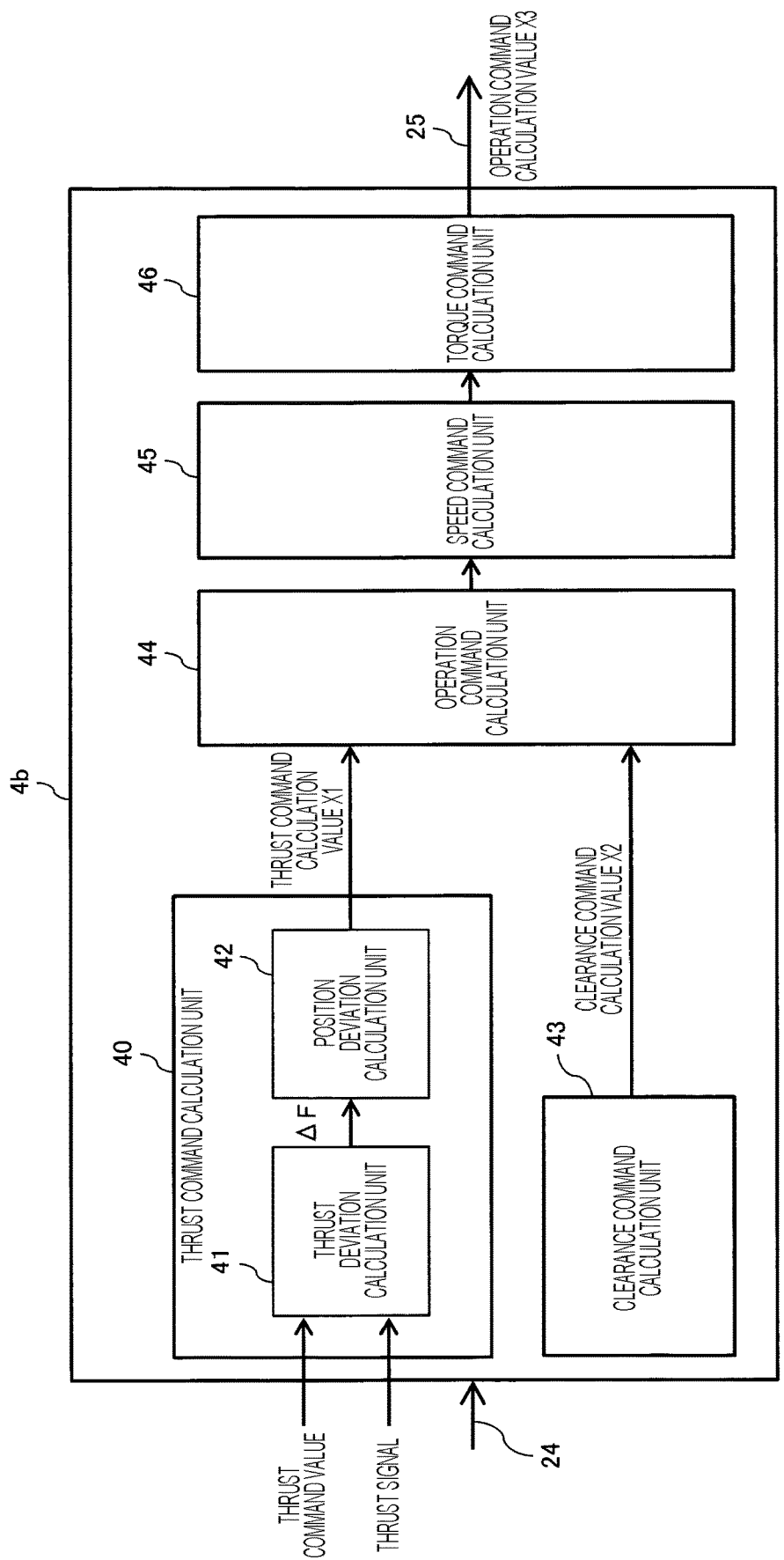
FIG. 8 is a functional block diagram of a command value calculation unit of a third embodiment according to still another embodiment of the present invention.

FIG. 8 is a functional block diagram of a command value calculation unit of a third embodiment according to still another embodiment of the present invention. The present embodiment is different from the first embodiment in that a command value calculation unit 4b further includes the speed command calculation unit 45 and a torque command calculation unit 46. Other configurations are the same as those in the first embodiment, the same components as those in the first embodiment are denoted by the same reference signs, and the description overlapping with the first embodiment will be omitted hereinafter.

As illustrated in FIG. 8, the command value calculation unit 4b according to the present embodiment includes the speed command calculation unit 45 and the torque command calculation unit 46 in addition to the thrust command calculation unit 40 having the thrust deviation calculation unit 41 and the position deviation calculation unit 42, the clearance command calculation unit 43, and the operation command calculation unit 44.

The torque command calculation unit 46 creates a torque command or a current/voltage command so as to follow a speed command value obtained by the speed command calculation unit 45. In practice, it is conceivable to take a difference between the speed command value and a current piston speed and multiply the difference by a gain to obtain the torque command. Alternatively, the speed command may be calculated from an equation of motion in consideration of the inertia of a caliper. Through the above calculation, the operation command calculation value X3 as the torque command or current/voltage command is output to the motor control unit 3 in the present embodiment.

As described above, it is possible to obtain the same effect as that in the first embodiment described above by giving the torque or current/voltage command to the motor control unit in the present embodiment.

Note that the present invention is not limited to the above-described embodiments, but includes various modifications. For example, the above-described embodiments have been described in detail in order to describe the present invention in an easily understandable manner, and are not necessarily limited to one including the entire configuration that has been described above.

In addition, the citations of other claims in the dependent claims are unary citations for the sake of clarity of the description of the dependent claims but the present invention includes a form in which a plurality of claims are cited and a form in which a plurality of multi-claims are cited in the dependent claims.

REFERENCE SIGNS LIST 1 brake system
2 drive mechanism
2a electric motor
2b speed reducer
3 motor control unit
4, 4a, 4b command value calculation unit
10 brake control device
11 braking mechanism
11a brake pad
11b brake disc
12 rotation/linear motion conversion mechanism
12a piston
12b feed screw
21 control signal line
22, 23, 24, 25 communication line
26 main power line
31 thrust sensor
32 position sensor
40 thrust command calculation unit
41 thrust deviation calculation unit
42 position deviation calculation unit
43 clearance command calculation unit
44 operation command calculation unit
45 speed command calculation unit
46 torque command calculation unit

The invention claimed is:

1. A brake control device, which is mounted on a brake system at least including a piston that moves in a linear motion direction by rotation of an electric motor, a brake pad that is pressed against a brake disc by the movement of the piston, and a position detection unit that detects a position of the piston, and controls a motion of the piston, comprising:
a command calculation unit that calculates an operation command value for making a pressing force by which the brake pad is pressed against the brake disc reach a target thrust value,
wherein the command calculation unit includes:
a clearance command calculation unit that calculates a command value required for contact between the brake pad and the brake disc; and
a thrust command calculation unit that calculates a command value required for reaching a target thrust from a state where the brake pad and the brake disc are in contact with each other, and the command calculation unit calculates the operation command value by integrating the command value calculated from the clearance command calculation unit and the command value calculated from the thrust command calculation unit when calculating the operation command value from a state where the brake pad and the brake disc are separated from each other.

2. The brake control device according to claim 1, wherein the command calculation unit includes an operation command calculation unit, and the operation command calculation unit integrates the command value calculated from the clearance command calculation unit and the command value calculated from the thrust command calculation unit and outputs a position command regarding an advance amount of the piston or the electric motor as the operation command value.

3. The brake control device according to claim 2, wherein the command calculation unit further includes a speed command calculation unit, the speed command calculation unit outputs a speed command regarding the advance amount of the piston or the electric motor as the operation command value based on an output from the operation command calculation unit.

4. The brake control device according to claim 3, wherein the command calculation unit further includes a torque command calculation unit, the speed command calculation unit outputs a torque command regarding the advance amount of the piston or the electric motor as the operation command value based on an output from the speed command calculation unit.

5. The brake control device according to claim 1, wherein the operation command value causes a piston speed to decrease monotonically after the contact between the brake pad and the brake disc, and a piston speed to a position where the brake pad and the brake disc come into contact with each other is determined without depending on a magnitude of the target thrust.

6. The brake control device according to claim 2, wherein the operation command calculation unit obtains an operation command value of a piston position by adding the command value calculated from the clearance command calculation unit and the command value calculated from the thrust command calculation unit, and outputs the obtained operation command value of the piston position as the operation command value.

7. A brake system comprising:
a piston that moves in a linear motion direction by rotation of an electric motor;
a brake pad that is pressed against a brake disc by the movement of the piston;
a position detection unit that detects the position of the piston; and
a brake control device that controls a motion of the piston, wherein the brake control device according to claim 1 is used as the brake control device.

* * * * *